United States Patent
Sebire et al.

(10) Patent No.: US 11,690,068 B2
(45) Date of Patent: Jun. 27, 2023

(54) OPTIMAL BSR FOR LIMITED TRAFFIC MIX

(71) Applicant: Nokia Technologies Oy, Espoo (FI)

(72) Inventors: Benoist Sebire, Tokyo (JP); Chunli Wu, Beijing (CN); Samuli Turtinen, Ii (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/252,341

(22) PCT Filed: Jun. 21, 2018

(86) PCT No.: PCT/CN2018/092253
§ 371 (c)(1),
(2) Date: Dec. 15, 2020

(87) PCT Pub. No.: WO2019/241972
PCT Pub. Date: Dec. 26, 2019

(65) Prior Publication Data
US 2021/0274530 A1  Sep. 2, 2021

(51) Int. Cl.
*H04W 4/00* (2018.01)
*H04W 72/21* (2023.01)
*H04W 28/02* (2009.01)
*H04W 28/06* (2009.01)
*H04W 72/56* (2023.01)

(52) U.S. Cl.
CPC ....... *H04W 72/21* (2023.01); *H04W 28/0278* (2013.01); *H04W 28/06* (2013.01); *H04W 72/56* (2023.01)

(58) Field of Classification Search
CPC ......... H04W 72/1284; H04W 28/0278; H04W 28/06; H04W 72/10
USPC .................................................. 370/329, 330
See application file for complete search history.

(56) References Cited

U.S. PATENT DOCUMENTS

| | | | | |
|---|---|---|---|---|
| 10,887,790 | B2 * | 1/2021 | Li | H04W 72/1284 |
| 10,932,154 | B2 * | 2/2021 | Tang | H04L 1/1614 |
| 11,234,156 | B2 * | 1/2022 | Tang | H04W 80/02 |
| 2011/0242972 | A1 | 10/2011 | Sebire et al. | |

(Continued)

FOREIGN PATENT DOCUMENTS

| | | |
|---|---|---|
| CN | 107360591 A | 11/2017 |
| CN | 107889144 A | 4/2018 |
| WO | 2010/043963 A1 | 4/2010 |

OTHER PUBLICATIONS

Extended European Search Report received for corresponding European Patent Application No. 18923056.8, dated Dec. 23, 2021, 6 pages.

(Continued)

*Primary Examiner* — Chuong T Ho
(74) *Attorney, Agent, or Firm* — Brake Hughes Bellermann LLP

(57) ABSTRACT

Embodiments of the present disclosure relate to a method, device and computer readable storage media for optimizing buffer state report (BSR) for limited traffic mix. In example embodiments, whether a short or long BSR being reported is up to the configuration of LCG or the configuration of LCH within the LCG. In this way, minimum overhead for low bit rate services can be kept and thus a good coverage can be achieved, while the reporting information can be increased for other traffic.

16 Claims, 4 Drawing Sheets

(56) References Cited

U.S. PATENT DOCUMENTS

| | | | |
|---|---|---|---|
| 2012/0099452 A1* | 4/2012 | Dai | H04W 72/1284 370/252 |
| 2015/0043352 A1 | 2/2015 | Jang et al. | |
| 2016/0205681 A1* | 7/2016 | Kim | H04W 76/15 370/329 |
| 2016/0286412 A1* | 9/2016 | Kim | H04W 76/10 |
| 2017/0013634 A1* | 1/2017 | Tsuboi | H04W 72/10 |
| 2017/0019812 A1* | 1/2017 | Lee | H04W 76/14 |
| 2018/0206290 A1* | 7/2018 | Dai | H04W 52/50 |
| 2019/0150176 A1* | 5/2019 | Pelletier | H04W 72/0453 370/329 |
| 2019/0230552 A1* | 7/2019 | Yu | H04W 28/0278 |
| 2020/0029353 A1* | 1/2020 | Xu | H04W 52/0209 |
| 2020/0037199 A1* | 1/2020 | Wang | H04W 72/14 |
| 2020/0045577 A1* | 2/2020 | Yu | H04W 28/06 |
| 2020/0053594 A1* | 2/2020 | Jiang | H04W 76/27 |
| 2020/0137785 A1* | 4/2020 | Deogun | H04W 72/1268 |
| 2020/0259896 A1* | 8/2020 | Sachs | H04W 56/001 |
| 2020/0296620 A1* | 9/2020 | Tang | H04W 28/0278 |
| 2021/0203436 A1* | 7/2021 | Jiang | H04L 1/0027 |

OTHER PUBLICATIONS

"[99bis#39][NR UP/MAC]—BSR open issues", 3GPP TSG-RAN WG2 Meeting #100, R2-1712827, Agenda item: 10.3.1.6, vivo, Nov. 27-Dec. 1, 2017, 38 pages.

Office action received for corresponding Indian Patent Application No. 202147000598, dated Jan. 5, 2022, 7 pages.

"3rd Generation Partnership Project; Technical Specification Group Radio Access Network; Evolved Universal Terrestrial Radio Access (E-UTRA); Medium Access Control (MAC) protocol specification (Release 15)", 3GPP TS 36.321, V15.1.0, Mar. 2018, pp. 1-109.

"3rd Generation Partnership Project; Technical Specification Group Radio Access Network; NR; Medium Access Control (MAC) protocol specification (Release 15)", 3GPP TS 38.321, V15.1.0, Mar. 2018, pp. 1-67.

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331, V15.1.0, Mar. 2018, pp. 1-786.

"3rd Generation Partnership Project; Technical Specification Group Radio Access Network; NR; Radio Resource Control (RRC) protocol specification (Release 15)", 3GPP TS 38.331, V15.1.0, Mar. 2018, pp. 1-268.

"Offline discussion on BSR for one LCG case", ETSI (3GPP_TSG_RAN_WG2 Archives), Retrieved on Jan. 7, 2021, 15 pages, Webpage available at: https://list.etsi.org/scripts/wa.exe?A2=3GPP_TSG_RAN_WG2;c1ad335.1805C.

"BSR for one LCG case", 3GPP TSG-RAN WG2 #102, R2-1807443, Agenda item: 10.2.2.1, Huawei, May 21-25, 2018, 6 pages.

International Search Report and Written Opinion received for corresponding Patent Cooperation Treaty Application No. PCT/CN2018/092253, dated Mar. 21, 2019, 9 pages.

* cited by examiner

OPTIMAL BSR FOR LIMITED TRAFFIC MIX

RELATED APPLICATION

This application claims priority to PCT Application No. PCT/CN2018/092253, filed on Jun. 21, 2018, which is incorporated herein by reference in its entirety.

FIELD

Embodiments of the present disclosure generally relate to the field of communications, and in particular, to a method, device and computer readable storage media for optimizing buffer state report for limited traffic mix.

BACKGROUND

Since Long Term Evolution (LTE) Rel-8, to assist the scheduler, the evolved NodeB (eNodeB or eNB) can configure User Equipment (UE) to send Buffer Status Reports (BSR) and Power Headroom Reports (PHR) in uplink. BSR indicates the amount of data the UE has available for transmission, while PHR provides the eNB with information about the difference between the nominal UE maximum transmit power and the estimated power for Uplink Shared Channel (UL-SCH) transmission. BSR are typically used by the eNB to choose an appropriate transport block size while PHR are typically used to select and appropriate coding scheme (MCS) and number of allocated Physical Resource Blocks (PRBs).

If the UE has no allocation available on the Physical Uplink Shared Channel (PUSCH) for the transmission time interval (TTI) where the BSR is triggered, a Scheduling Request (SR) is then triggered. The SR is transmitted on the Physical Uplink Control Channel (PUCCH) using dedicated resources which are allocated on a UE basis with a certain periodicity. Also note that BSRs/SRs can also be triggered based on configurations of periodical BSR.

In both LTE and 5G NR, different types of BSR are defined to minimize overhead when possible and maximize the information provided to the scheduler when needed. For instance, in NR, four types of BSR are defined, namely, Short BSR, Short truncated BSR, Long BSR, Long truncated BSR. The Short BSR minimizes overhead and is currently used when there is only one LCG with data buffered.

SUMMARY

In general, example embodiments of the present disclosure provide a method, device and computer readable storage media for optimizing buffer state report (BSR) for limited traffic mix.

In a first aspect, a method at a terminal device is provided. In response to detecting, at a terminal device, that a buffer state report (BSR) is to be triggered, whether data buffered at the terminal device and available for transmission is included in a single logical channel group (LCG) is determined. The BSR indicates amount of the data. In response to determining that the data is included in a single LCG, a format of the BSR is determined based on a configuration of the LCG or a configuration of a logical channel, LCH, within the LCG. The format of the BSR is selected from a group consisting of short BSR and long BSR.

In a second aspect, there is provided a device which comprises: at least one processor and at least one memory including computer program code. The at least one memory and the computer program code are configured to, with the at least one processor, cause the device to: in response to detecting, at a terminal device, that a BSR is to be triggered, determine whether data buffered at the terminal device and available for transmission is included in a single LCG, the BSR indicating amount of the data; and in response to determining that the data is included in a single LCG, determine a format of the BSR based on a configuration of the LCG or a configuration of a logical channel, LCH, within the LCG, the format of the BSR selected from a group consisting of short BSR and long BSR.

In a third aspect, an apparatus is provided. The apparatus comprises: means for determining whether data buffered at the terminal device and available for transmission is included in a single logical channel group, LCG, in response to detecting, at a terminal device, that a buffer state report, BSR, is to be triggered, the BSR indicating amount of the data; and means for determining a format of the BSR based on a configuration of the LCG or a configuration of a logical channel, LCH, within the LCG, in response to determining that the data is included in a single LCG, the format of the BSR selected from a group consisting of short BSR and long BSR.

In a fourth aspect, there is provided a computer readable storage medium that stores a computer program thereon. The computer program, when executed by a processor, causes the processor to carry out the method according to the first aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
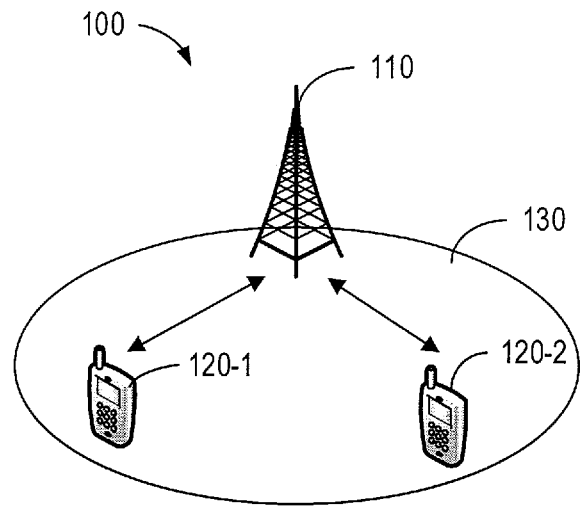
FIG. 1 illustrates an example communication network in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "communication network" refers to a network that follows any suitable communication standards or protocols such as long term evolution (LTE), LTE-Advanced (LTE-A) and 5G NR, and employs any suitable communication technologies, including, for example, Multiple-Input Multiple-Output (MIMO), OFDM, time division multiplexing (TDM), frequency division multiplexing (FDM), code division multiplexing (CDM), Bluetooth, ZigBee, machine type communication (MTC), eMBB, mMTC and uRLLC technologies. For the purpose of discussion, in some embodiments, the LTE network, the LTE-A network, the 5G NR network or any combination thereof is taken as an example of the communication network.

As used herein, the term "network device" refers to any suitable device at a network side of a communication network. The network device may include any suitable device in an access network of the communication network, for example, including a base station (BS), a relay, an access point (AP), a node B (NodeB or NB), an evolved NodeB (eNodeB or eNB), a gigabit NodeB (gNB), a Remote Radio Module (RRU), a radio header (RH), a remote radio head (RRH), a low power node such as a femto, a pico, and the like. Further, the function of a gNB can be split into different locations, for example, in central units (CU) and distributed units (DU), in various deployment options. For the purpose of discussion, in some embodiments, the eNB is taken as an example of the network device.

The network device may also include any suitable device in a core network, for example, including multi-standard radio (MSR) radio equipment such as MSR BSs, network controllers such as radio network controllers (RNCs) or base station controllers (BSCs), Multi-cell/multicast Coordination Entities (MCEs), Mobile Switching Centers (MSCs) and MMEs, Operation and Management (O&M) nodes, Operation Support System (OSS) nodes, Self-Organization Network (SON) nodes, positioning nodes, such as Enhanced Serving Mobile Location Centers (E-SMLCs), and/or Mobile Data Terminals (MDTs).

As used herein, the term "terminal device" refers to a device capable of, configured for, arranged for, and/or operable for communications with a network device or a further terminal device in a communication network. The communications may involve transmitting and/or receiving wireless signals using electromagnetic signals, radio waves, infrared signals, and/or other types of signals suitable for conveying information over air. In some embodiments, the terminal device may be configured to transmit and/or receive information without direct human interaction. For example, the terminal device may transmit information to the network device on predetermined schedules, when triggered by an internal or external event, or in response to requests from the network side.

Examples of the terminal device include, but are not limited to, user equipment (UE) such as smart phones, wireless-enabled tablet computers, laptop-embedded equipment (LEE), laptop-mounted equipment (LME), and/or wireless customer-premises equipment (CPE). For the purpose of discussion, in the following, some embodiments will be described with reference to UEs as examples of the terminal devices, and the terms "terminal device" and "user equipment" (UE) may be used interchangeably in the context of the present disclosure.

As used herein, the singular forms "a", "an", and "the" are intended to include the plural forms as well, unless the context clearly indicates otherwise. The term "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

The inventors find that in both LTE and 5G NR network, the motivation of using Short Buffer Status Reports (BSR) when there is only one logical channel group (LCG) with data buffered is to reduce signaling overhead and hence increase coverage, especially for low bit rate services such as Voice over Internet Protocol (VoIP) where one byte overhead matters. The problem with NR is that due to the increase of LCGs to be reported, the number of bits which can be used to report the buffer size (BS) decreases in order to keep the short BSR one byte long. It is to be noted that in NR, 5 bits is used for BS field (instead of 6 bits in LTE). Further, the 5 bits BS field are also to be compared with the 8 bits for Long BSR.

An obvious solution would be to make the short BSR two bytes long to accommodate a longer BS field. However, this would defeat the purpose of having a short BSR in the first place as well as increase overhead compared to LTE.

Another obvious solution would be to configure the UE to either report short or long. However, such a solution is not flexible and makes radio resource control (RRC) reconfiguration frequent depending on the traffic mix. Indeed with such a solution, it is not possible to fulfill the opposite requirements occurring when e.g. VoIP is mixed with background data: on one hand, a short BSR is needed to limit overhead, on the other hand, a long BSR is needed to increase reporting accuracy.

It was also proposed to use Long BSR for the single LCG case as long as the grant is big enough for the Long BSR to provide more information to a NR NodeB (gNB). Unfortunately, because in logical channel prioritization the BSR format is first selected, this solution is equivalent to using the Long BSR always, which introduces extra overhead for VoIP and requires the gNB to always provide big enough for both Long BSR plus speech frame, thereby reducing the coverage.

It was also proposed to rely on the amount of buffered data to select the BSR format and/or rely on the number of configured carriers. However, this does not help in this scenario as the gNB would still have to consider the worst case to avoid segmenting speech frames. It was also proposed introduce threshold based BSR table selection, so that when the BS threshold is above the maximum value of the first table it can indicate, then the second table with larger maximum value will be selected. However, such solution has the same drawback (that is, the gNB would still have to consider the worst case to avoid segmenting speech frames).

Embodiments of the present disclosure provide a new scheme for optimizing BSR for limited traffic mix. The basic idea is that when only one LCG is being reported in a regular or periodic BSR (that is, when there is data available for transmission for only one LCG), whether a short or long BSR being reported is up to the network configuration.

Specifically, in various embodiments of the present disclosure, whether a short or long BSR being reported is up to the configuration of LCG or the configuration of LCH within LCG, depending on the granularity of the RRC configuration being per LCG or per LCH.

FIG. 1 illustrates an example communication network 100 in which embodiments of the present disclosure can be implemented. The communication network 100 may comply with any suitable protocol or standard that already exists or will be developed in the future. In some embodiments, the communication network 100 may be the LTE (or LTE-A) network, the NR network or combination thereof.

The communication network 100 comprises a network device 110. The network device 110 serves two terminal devices (including a first terminal device 120-1 and a second terminal device 120-2, collectively referred to as a terminal device 120) in a cell 130. It is to be understood that the numbers of network devices and terminal devices are shown only for the purpose of illustration without suggesting any limitation. The network 100 may include any suitable numbers of network devices and terminal devices.

The first and second terminal devices 120-1 and 120-2 may communicate with the network device 110 or with each other via the network device 110. The communication may utilize any suitable technology that already exists or will be developed in the future.

The network device 110 can configure the terminal device 120 to send BSR in uplink. As discussed above, BSR indicates the amount of data that the terminal device 120 has available for transmission. BSR are typically used by the network device 110 to choose an appropriate transport block size. In the context, the BSR can be a regular BSR or a periodic BSR.

Figure 2:
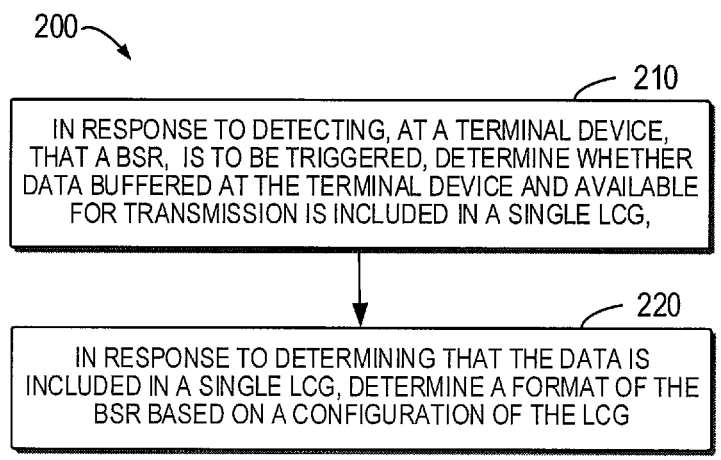
FIG. 2 illustrates a flowchart of an example method in accordance with some embodiments of the present disclosure.

FIG. 2 shows a flowchart of an example method 200 in accordance with some embodiments of the present disclosure. The method 200 can be implemented at the terminal device 120 as shown in FIG. 1. For the purpose of discussion, the method 200 will be described with reference to FIG. 1.

Method 200 describes the determination of the format of BSR when the granularity of the RRC configuration is per LCG. At block 210, when the terminal device 120 detects that a BSR is to be triggered, whether data buffered at the terminal device 120 and available for transmission is included in a single LCG or a plurality of LCGs is detected.

Among other conditions, a BSR is to be triggered in the terminal device 120:
  if data arriving in the buffer of the terminal device 120 has higher priority than the data already available for transmission, or
  if new data arrives in an empty buffer of the terminal device 120.

At block 220, when it is determined that the data is included in a single LCG, the format of the BSR is determined based on a configuration of the LCG. The format of the BSR is selected from a group consisting of short BSR and long BSR. Short BSR (and also Short Truncated BSR) is only one byte long with 5 bits for the BS field, while Long (and also Long Truncated BSR) is at least 2 bytes long with 8 bits for the BS field.

In some embodiments, when the single LCG with data buffered is configured to enable long BSR, the long BSR for the LCG is selected. Otherwise, the short BSR for the LCG is selected. That is to say, once the configuration of the LCG is "long-BSR-enabled", the terminal device 120 will report Long BSR, even if there is only one LCG has the buffered data.

In some embodiments, when the data is determined to be included in a plurality of LCGs (that is, more than one LCG), the long BSR for the plurality of LCGs will be selected. Otherwise, the short BSR is reported.

Alternatively, or in addition, in some embodiments, a transport block size allocated for the amount of the data may be determined. Then the format of the BSR can be determined based on the configuration of the single LCG and a comparison between the transport block size with a predefined first transport block size threshold.

For example, when determining that the LCG is configured to enable long BSR (that is, the configuration of the LCG is "long-BSR-enabled") and that the transport block size is larger than the predefined first transport block (TB) size threshold (may also referred to as "long BSR TB threshold"), the long BSR is selected. Otherwise, the short BSR for the LCG is selected.

In some other embodiments, the format of the BSR can be determined only based on the comparison between the TB size with the predefined first transport block size threshold, regardless of the configuration of the LCG. For example, Long BSR is used when the transport block size is larger than a predefined number of bits, and Short BSR is used when the transport block size is smaller than the predefined number of bits.

It is to be understood that alternatively, in some embodiments, the default behavior could be changed so that the long BSR is sent unless a "short-BSR-enabled" is configured.

Figure 3:
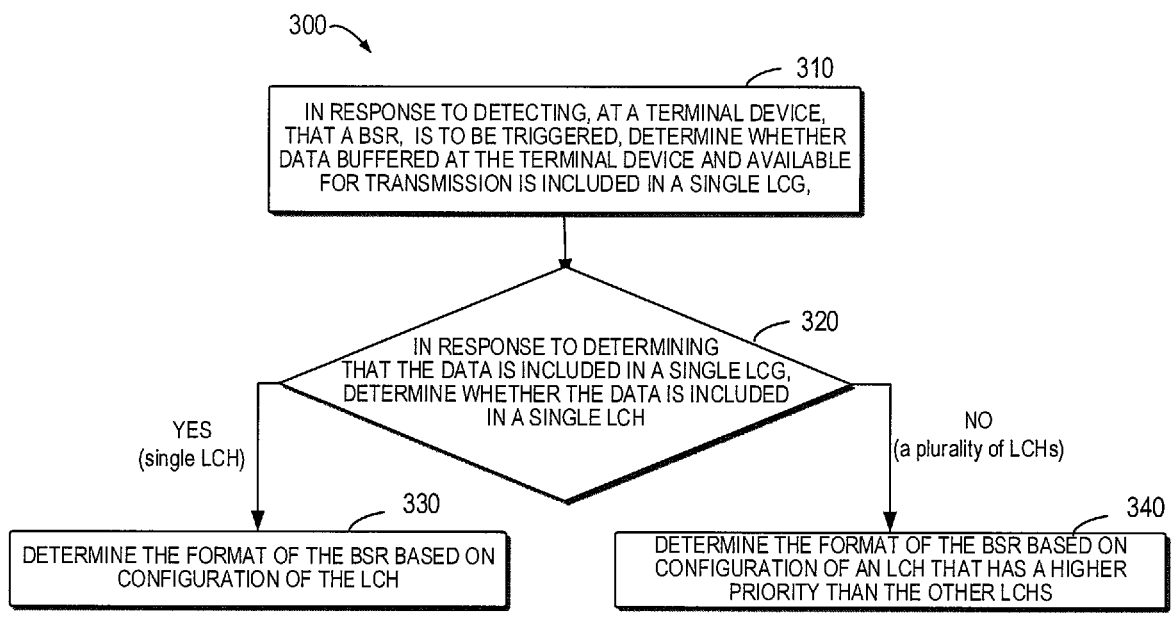
FIG. 3 illustrates a flowchart of another example method in accordance with some embodiments of the present disclosure.

FIG. 3 which shows a flowchart of another example method 300 in accordance with some embodiments of the present disclosure. The method 300 can likewise be implemented at the terminal device 120 as shown in FIG. 1. For the purpose of discussion, the method 300 will also be described with reference to FIG. 1. The difference between method 300 and method 200 is that method 300 describes the determination of the format of BSR when the granularity of the RRC configuration is per LCH within the LCG.

Referring to FIG. 3, at block 310, when the terminal device 120 detects that a BSR is to be triggered, whether data buffered at the terminal device 120 and available for transmission is included in a single LCG or a plurality of LCGs is detected. The act implemented at block 310 is the substantially same as that implemented at block 210 in FIG. 2.

At block 320, when it is determined that that the data is included in a single LCG, whether the data is included in a single LCH or included in a plurality of LCHs within the LCG needs to be further determined. If it is determined, at block 330, that the data is included in a single LCH, the format of the BSR will be determined based on configuration of the LCH. If it is determined, at block 340, that the data is included in a plurality of LCHs within the LCG, the format of the BSR will be determined based on configuration of an LCH with data buffered that has a higher priority than the other LCHs (i.e. the LCH having the highest priority).

In some embodiments, when the LCH with data buffered that has a higher priority than the other LCHs is configured to enable long BSR (that is, the configuration of the LCH having the highest priority with data is "long-BSR-enabled"), the long BSR will be selected for the LCG. When the LCH with data buffered that has a higher priority than the other LCHs is configured to not enable long BSR (that is, the configuration of the LCH having the highest priority is not "long-BSR-enabled"), the Short BSR will be selected for the LCG.

Figure 4A:
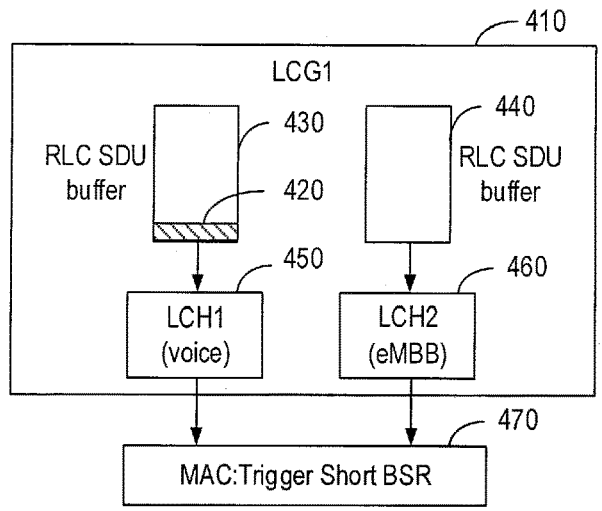
FIG. 4A illustrates an example BSR format selection according to some embodiments of the present disclosure.
Figure 4B:
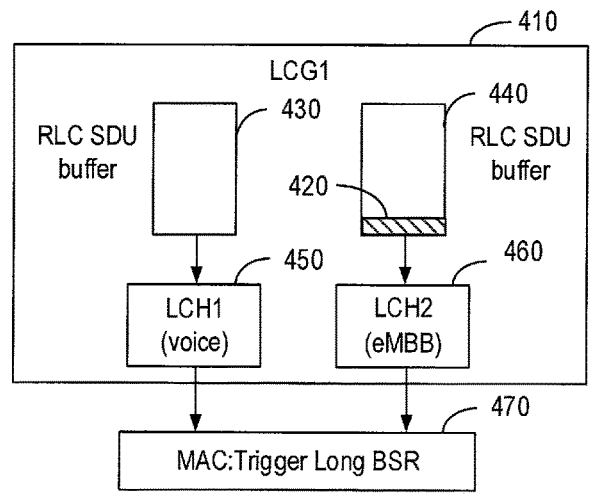
FIG. 4B illustrates another example BSR format selection according to some embodiments of the present disclosure.
Figure 4C:
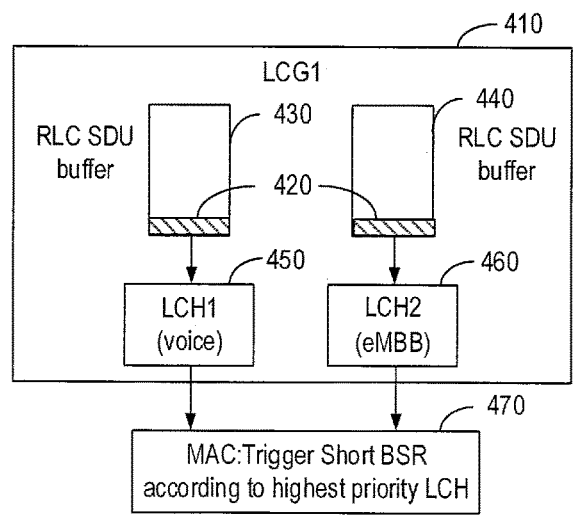
FIG. 4C illustrates yet another example BSR format selection according to some embodiments of the present disclosure.

FIGS. 4A-4C illustrate some example BSR format selection according to some embodiments of the present disclosure. As illustrated in FIGS. 4A-4C, two LCHs are included in an LCG. The LCH1 450 (that is, the first LCH) is configured for a voice service, and the LCH2 460 (that is, the second LCH) is configured for an enhanced broadband (eMBB) service. LCH1 has higher priority than LCH2 and LCH2 is configured with long-BSR-enabled Referring to FIG. 4A, in this example, the data 420 is only included in a single LCG 410 (also referred to as "LCG1"), and the data 420 is further only included in a radio link control (RLC) service data unit (SDU) buffer 430 associated with the single LCH1 450. In other words, only LCH1 450 within the LCG1 410 has the data 420 available for transmission. Accordingly, the format of the BSR will determined based on the configuration of LCH1 450 having the data 420. In this case, media access control (MAC) entity 470 will trigger Short BSR.

Referring to FIG. 4B, in this example, the data 420 is likewise only included in the single LCG 410, and further only included in a RLC SDU buffer 440 associated with a single LCH2 460 within LCG 410. In other words, only LCH2 460 within the LCG1 410 has the data 420 available for transmission. Accordingly, the format of the BSR will be determined based on the configuration of LCH2 460 having the data 420. In this case, MAC entity 470 will trigger Long BSR.

Referring to FIG. 4C, in this scenario, the data is likewise only included in the single LCG 410, but further included in both RLC SDU buffer 430 associated with the LCH1 450 and RLC SDU buffer 440 associated with the LCH2 460. In other words, both LCH1 450 and LCH2 460 within the LCG1 410 have the data 420 available for transmission. Accordingly, the format of the BSR is determined based on configuration of the LCH that has higher priority. In this case, the voice service has the higher priority than the eMBB service. Therefore, MAC entity 470 will trigger Short BSR.

Alternatively, or in addition, a transport block size that is allocated for the amount of the data can be determined. Accordingly, in some embodiments, the format of the BSR can be determined based on the configuration of the LCH and a comparison between the transport block size with a predefined second transport block size threshold.

For example, when determining that the LCH is configured to enable long BSR and that the transport block size is larger than the predefined second transport block size threshold, the long BSR is selected. In some embodiments, the second transport block size threshold can be the same as the first transport block size threshold. In some other embodiments, the second transport block size threshold can be different from the first transport block size threshold.

In some other embodiments, the format of the BSR can be determined only based on the comparison between the transport block size with the predefined second transport block size threshold, regardless of the configuration of the LCH. For example, Long BSR is used when the transport block size is larger than a predefined number of bits and Short BSR is used when the transport block size is smaller than the predefined number of bits.

Again, it is to be understood that alternatively, the default behavior could be changed so that the long BSR is sent unless a "short-BSR-enabled" is configured.

Alternatively, in some embodiments, two short BSR MAC CEs are used with 6 bits BS field and 2 bits LCG ID field as in LTE (compared with 5 bits BS field and 3 bits LCG ID field), and the Logical Channel Identifier (LCID) of the MAC CE signals the last or first bit of the LCG ID field. For instance, only the 2 least significant bit (LSB) bits of the LCG ID are signaled in the LCG ID field in the BSR MAC CE and the first MAC CE (with LCID x) represents "1" for the most significant bit (MSB) of the LCG ID and the second MAC CE (with LCID y) represents "0" for MSB of the LCG ID. Finally, instead of using two different LCIDs for MAC CEs to convey the MSB of the LCG ID, an R bit in the MAC subheader could also be used.

According to various embodiments of the present disclosure, reduced overhead (and thus enhanced coverage) for low bit rate services can be achieved, while high BSR reporting granularity for other services can be maintained as the short and long BSR have different granularities and different maximum values.

Moreover, when there are, for example, one LCH for VoIP and one LCH for eMBB configured at the same time, configuring them into same LCG would provide less overhead than configuring them into two separate LCGs, as based on the proposal whenever there is data for VoIP, Short BSR will be reported regardless of whether there is eMBB data in the buffer.

In addition, determining the format based on the available grant/TB size prioritizes the use of short format always when the number of available bits to transmit is small. In turns, when there are more bits available, the relative overhead introduced of reporting the Long format BSR is not critical anymore.

In some embodiments, an apparatus capable of performing the method 200 and method 300 (for example, the terminal device 120) may comprise means for performing the respective steps of the method 200 and method 300. The means may be implemented in any suitable form. For example, the means may be implemented in a circuitry or software module.

In some embodiments, the apparatus comprises: means for determining whether data buffered at the terminal device and available for transmission is included in a single logical channel group, LCG, in response to detecting, at a terminal device, that a buffer state report, BSR, is to be triggered, the BSR indicating amount of the data; and means for determining a format of the BSR based on a configuration of the LCG or a configuration of a logical channel, LCH, within the LCG, in response to determining that the data is included in a single LCG, the format of the BSR selected from a group consisting of short BSR and long BSR.

In some embodiments, the BSR is regular BSR or periodic BSR.

In some embodiments, the means for determining the format of the BSR comprises: means for selecting the long BSR for the LCG, in response to the LCG is configured to enable long BSR.

In some embodiments, the apparatus further comprises: means for selecting long BSR for the plurality of LCGs, in response to determining that the data is included in a plurality of LCGs.

In some embodiments, the means for determining the format of the BSR comprises: means for determining a transport block size allocated for the amount of the data; and means for determining the format of the BSR based on the configuration of the LCG and a comparison between the transport block size with a predefined first transport block size threshold.

In some embodiments, the means for determining the format of the BSR based on the configuration of the LCG and a comparison between the transport block size with a predefined first transport block size threshold comprises: means for selecting the long BSR, in response to determining that the LCG is configured to enable long BSR and that the transport block size is larger than the predefined first transport block size threshold.

In some embodiments, the means for determining the format of the BSR comprises: means for determining whether the data is included in a single LCH within the LCG in response to determining that the data is included in a single LCG; means for determining the format of the BSR based on configuration of the LCH in response to determining that the data is included in a single LCH; and means for determining the format of the BSR based on configuration of an LCH that has highest priority among the plurality of LCHs in response to determining that the data is included in a plurality of LCHs within the LCG.

In some embodiments, the means for determining the format of the BSR comprises: means for selecting the long BSR for the LCG in response to the LCH that has the highest priority among the plurality of LCHs is configured to enable long BSR; and means for selecting the Short BSR for the LCG in response to the LCH that has the highest priority among the plurality of LCHs with data is not configured to enable long BSR.

In some embodiments, the means for determining the format of the BSR comprises: means for determining the format of the BSR based on configuration of the first LCH, in response to determining that the data is included in a first LCH and a second LCH within the LCG, wherein the first LCH has a higher priority than the second LCH.

In some embodiments, the means for determining the format of the BSR comprises: means for determining a transport block size that is allocated for the amount of the data; and means for determining the format of the BSR based on the configuration of the LCH and a comparison between the transport block size with a predefined second transport block size threshold.

In some embodiments, the means for determining the format of the BSR based on the configuration of the LCH and a comparison between the transport block size with a predefined second transport block size threshold comprises: means for selecting the long BSR in response to determining that the LCH is configured to enable long BSR and that the transport block size is larger than the predefined second transport block size threshold.

Figure 5:
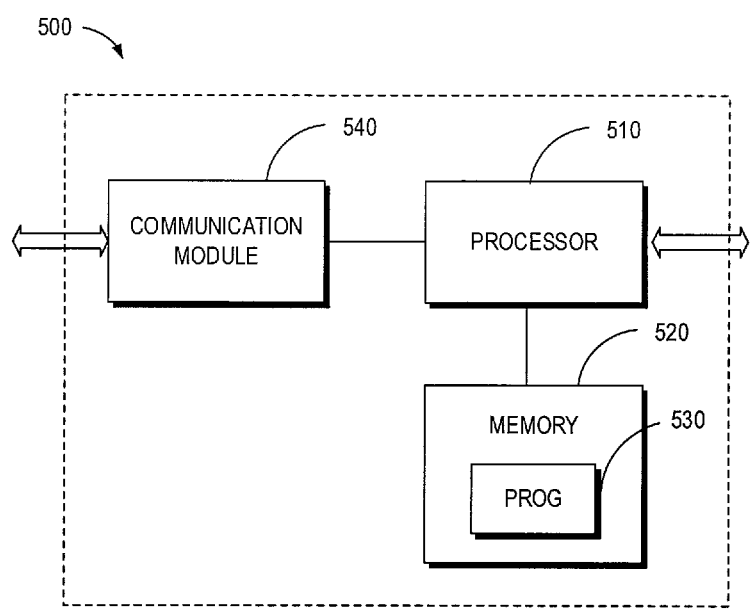
FIG. 5 illustrates a simplified block diagram of a device that is suitable for implementing embodiments of the present disclosure.

FIG. 5 is a simplified block diagram of a device 500 that is suitable for implementing embodiments of the present disclosure. The device 500 can be implemented at or as at least a part of the terminal device 120 as shown in FIG. 1.

As shown, the device 500 includes a processor 510, a memory 520 coupled to the processor 510, a communication module 540 coupled to the processor 510, and a communication interface (not shown) coupled to the communication module 540. The memory 510 stores at least a program 530. The communication module 540 is for bidirectional communications.

The program 530 is assumed to include program instructions that, when executed by the associated processor 510, enable the device 500 to operate in accordance with the embodiments of the present disclosure, as discussed herein with reference to FIGS. 1-4C. The embodiments herein may be implemented by computer software executable by the processor 510 of the device 500, or by hardware, or by a combination of software and hardware. The processor 510 may be configured to implement various embodiments of the present disclosure.

The memory 510 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 510 is shown in the device 500, there may be several physically distinct memory modules in the device 500. The processor 510 may be of any type suitable to the local technical network, and may include one or more of general purpose computers, special purpose computers, microprocessors, digital signal processors (DSPs) and processors based on multicore processor architecture, as non-limiting examples. The device 500 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 200 and method 300 as described above with reference to FIGS. 1-4C. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method comprising:
   in response to detecting, at a terminal device, that a buffer state report, BSR, is to be triggered, determining whether data buffered at the terminal device and available for transmission is included in a single logical channel group, LCG, the BSR indicating an amount of the data; and
   in response to determining that the data is included in a single LCG, determining a format of the BSR based on:
      determining a transport block size allocated for the amount of the data, a configuration of the LCG, and a comparison between the transport block size with a predefined first transport block size threshold; or
      determining whether the data is included in a single logical channel, LCH, or a plurality of LCHs within the LCG, determining the format of the BSR based on a configuration of the LCH in response to the determination that the data is included in the single LCH within the LCG, and determining the format of the BSR based on the configuration of the LCH that has a highest priority among a plurality of LCHs in response to determining that the data is included in the plurality of LCHs within the LCG.

2. The method of claim 1, wherein the BSR is regular BSR or periodic BSR.

3. The method of claim 1, wherein determining the format of the BSR comprises:
   selecting a long BSR for the LCG.

4. The method of claim 1, further comprising:
   in response to determining that the data is included in a plurality of LCGs, selecting long BSR for the plurality of LCGs.

5. The method of claim 1, wherein determining the format of the BSR comprises:
   determining the transport block size allocated for the amount of the data; and
   determining the format of the BSR based on the configuration of the LCG and the comparison between the transport block size with the predefined first transport block size threshold.

6. The method of claim 1, wherein determining the format of the BSR based on the configuration of the LCG and a comparison between the transport block size with a predefined first transport block size threshold comprises:
   in response to determining that the LCG is configured to enable long BSR and that the transport block size is larger than the predefined first transport block size threshold, selecting the long BSR.

7. The method of claim 1, wherein determining the format of the BSR comprises:
   in response to the LCH that has the highest priority among the plurality of LCHs with data is configured to enable long BSR, selecting the long BSR for the LCG; and
   in response to the LCH that has the highest priority among the plurality of LCHs with data is not configured to enable long BSR, selecting a Short BSR for the LCG.

8. The method of claim 1, wherein determining the format of the BSR comprises:
   in response to determining that the data is included in a first LCH and a second LCH within the LCG, determining the format of the BSR based on configuration of the first LCH, wherein the first LCH has a higher priority than the second LCH.

9. The method of claim 1, wherein determining the format of the BSR based on the configuration of the LCH and a comparison between the transport block size with a predefined second transport block size threshold comprises:
   in response to determining that the LCH is configured to enable long BSR and that the transport block size is larger than the predefined second transport block size threshold, selecting the long BSR.

10. A device comprising:
    at least one processor; and
    at least one memory including computer program code;
    the at least one memory and the computer program code configured to, with the at least one processor, cause the device to:
       in response to detecting, at a terminal device, that a buffer state report, BSR, is to be triggered, determine that data buffered at the terminal device and available for transmission is included in a single logical channel group, LCG, the BSR indicating an amount of the data; and
       in response to determining that the data is included in a single LCG, determine a format of the BSR based on:
          determining a transport block size allocated for the amount of data, a configuration of the LCG, and a comparison of the transport block size with a predefined first transport block size threshold; or
          determining that the data is included in a single logical channel, LCH, or a plurality of LCHs within the LCG, determining the format of the BSR based on a configuration of the LCH in response to the determination that the data is included in the single LCH within the LCG, and determining the format of the BSR based on the configuration of the LCH that has a highest priority among a plurality of LCHs in response to determining that the data is included in the plurality of LCHs within the LCG.

11. The device of claim 10, wherein the BSR is regular BSR or periodic BSR.

12. The device of claim 10, wherein the at least one memory and the computer program code are configured to, with the at least one processor, cause the device to:
    in response to the LCG is configured to enable long BSR, select the long BSR for the LCG.

13. The device of claim 10, wherein the at least one memory and the computer program code are further configured to, with the at least one processor, cause the device to:
    in response to determining that the data is included in a plurality of LCGs, select long BSR for the plurality of LCGs.

14. The device of claim 10, wherein the at least one memory and the computer program code are configured to, with the at least one processor, cause the device to:
    in response to determining that the LCG is configured to enable long BSR and that the transport block size is larger than the predefined first transport block size threshold, select the long BSR.

15. The device of claim 10, wherein the at least one memory and the computer program code are configured to, with the at least one processor, cause the device to:
    in response to the LCH that has the highest priority among the plurality of LCHs is configured to enable long BSR, select the long BSR for the LCG; and
    in response to the LCH that has the highest priority among the plurality of LCHs with data is not configured to enable long BSR, selecting a Short BSR for the LCG.

16. A non-transitory computer readable storage medium storing a computer program thereon, the computer program, when executed by a processor, causing a device to:
    in response to detecting, at a terminal device, that a buffer state report, BSR, is to be triggered, determine whether data buffered at the terminal device and available for transmission is included in a single logical channel group, LCG, the BSR indicating an amount of the data; and
    in response to determining that the data is included in a single LCG, determine a format of the BSR based on:
        determining a transport block size allocated for the amount of data, a configuration of the LCG, and a comparison of the transport block size with a predefined first transport block size threshold; or
        determining whether the data is included in a single logical channel, LCH, or a plurality of LCHs within the LCG, determining the format of the BSR based on a configuration of the LCH in response to the determination that the data is included in the single LCH within the LCG, and determining the format of the BSR based on the configuration of the LCH that has a highest priority among a plurality of LCHs in response to determining that the data is included in the plurality of LCHs within the LCG.

\* \* \* \* \*